UNITED STATES PATENT OFFICE.

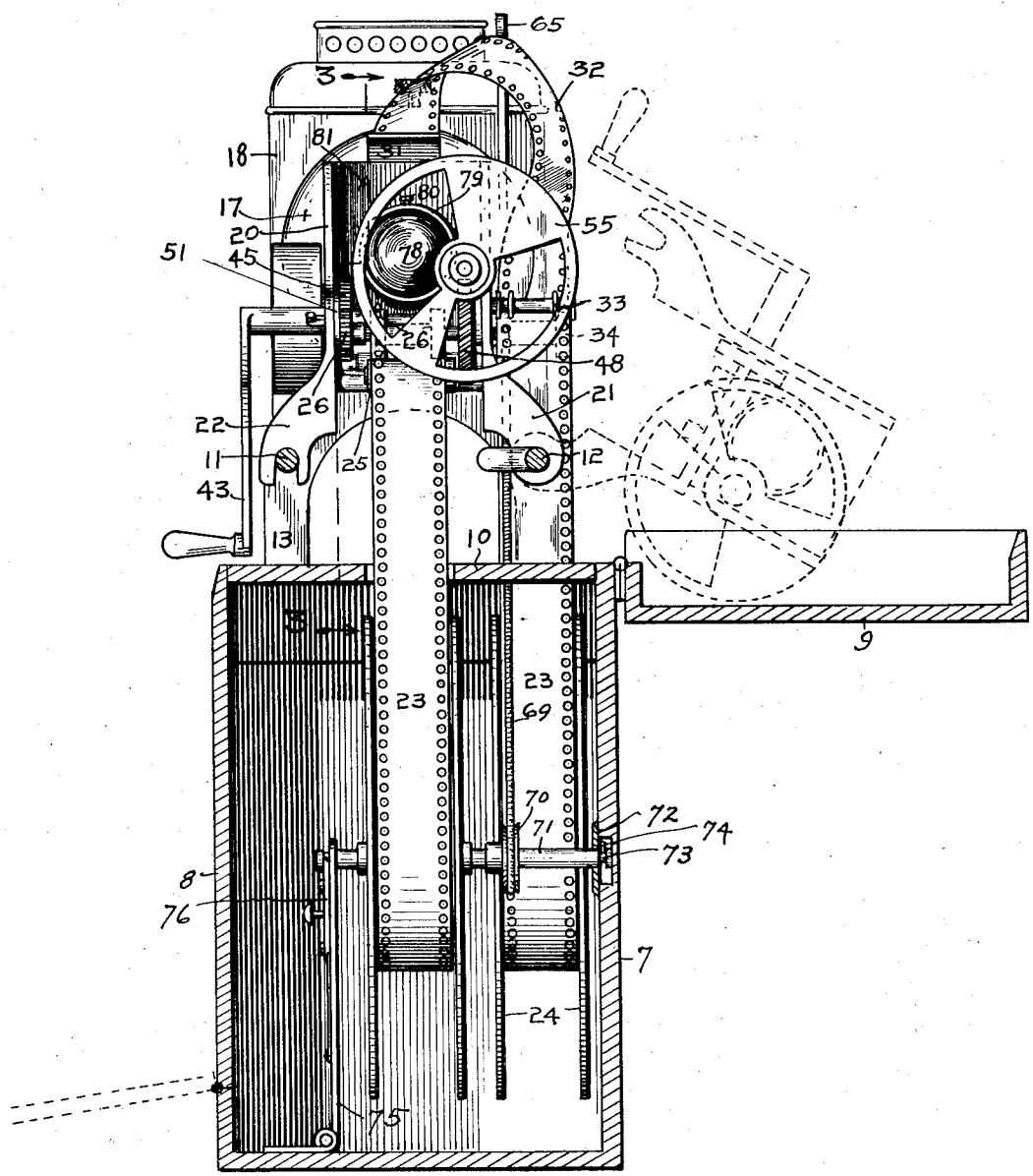

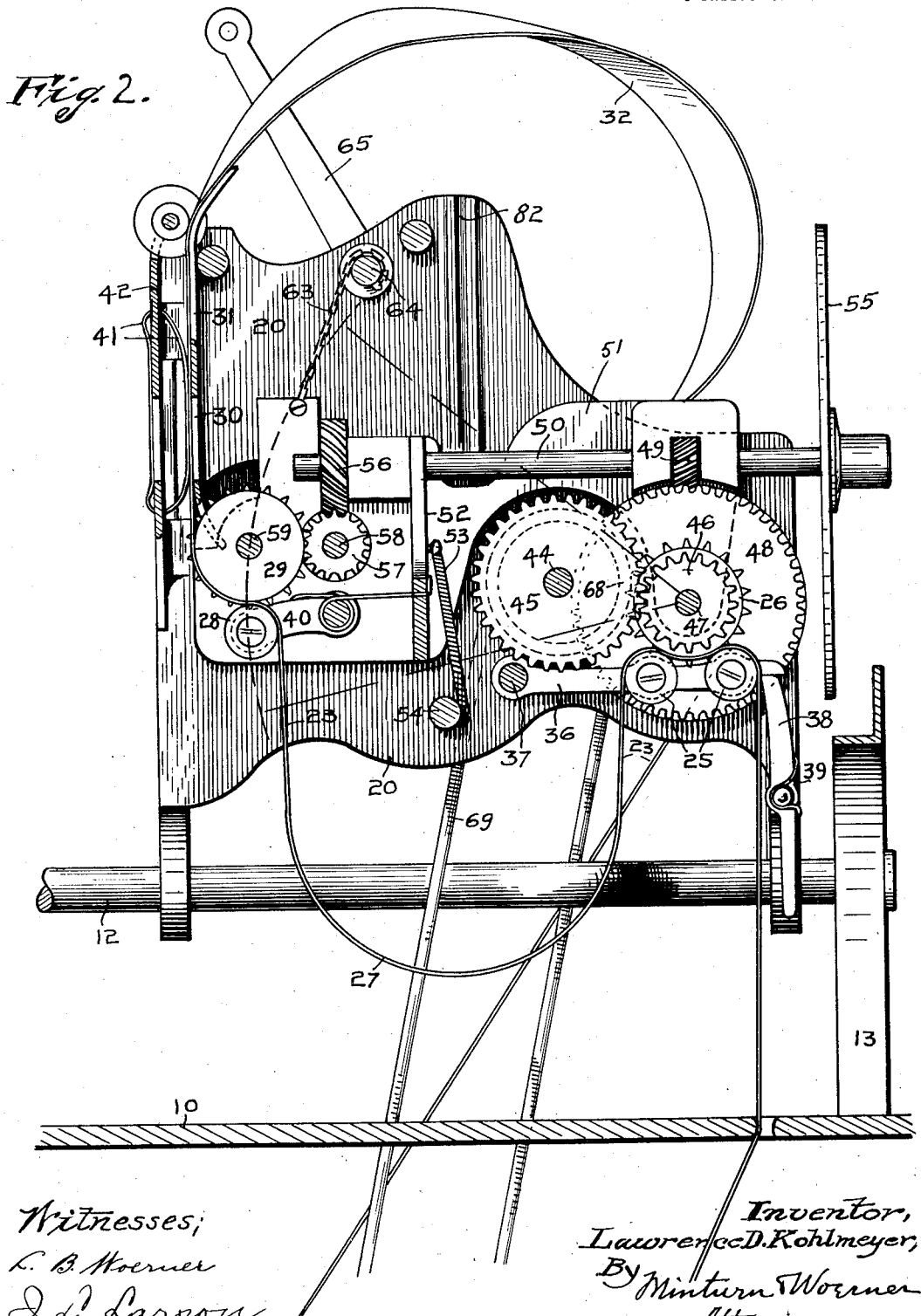

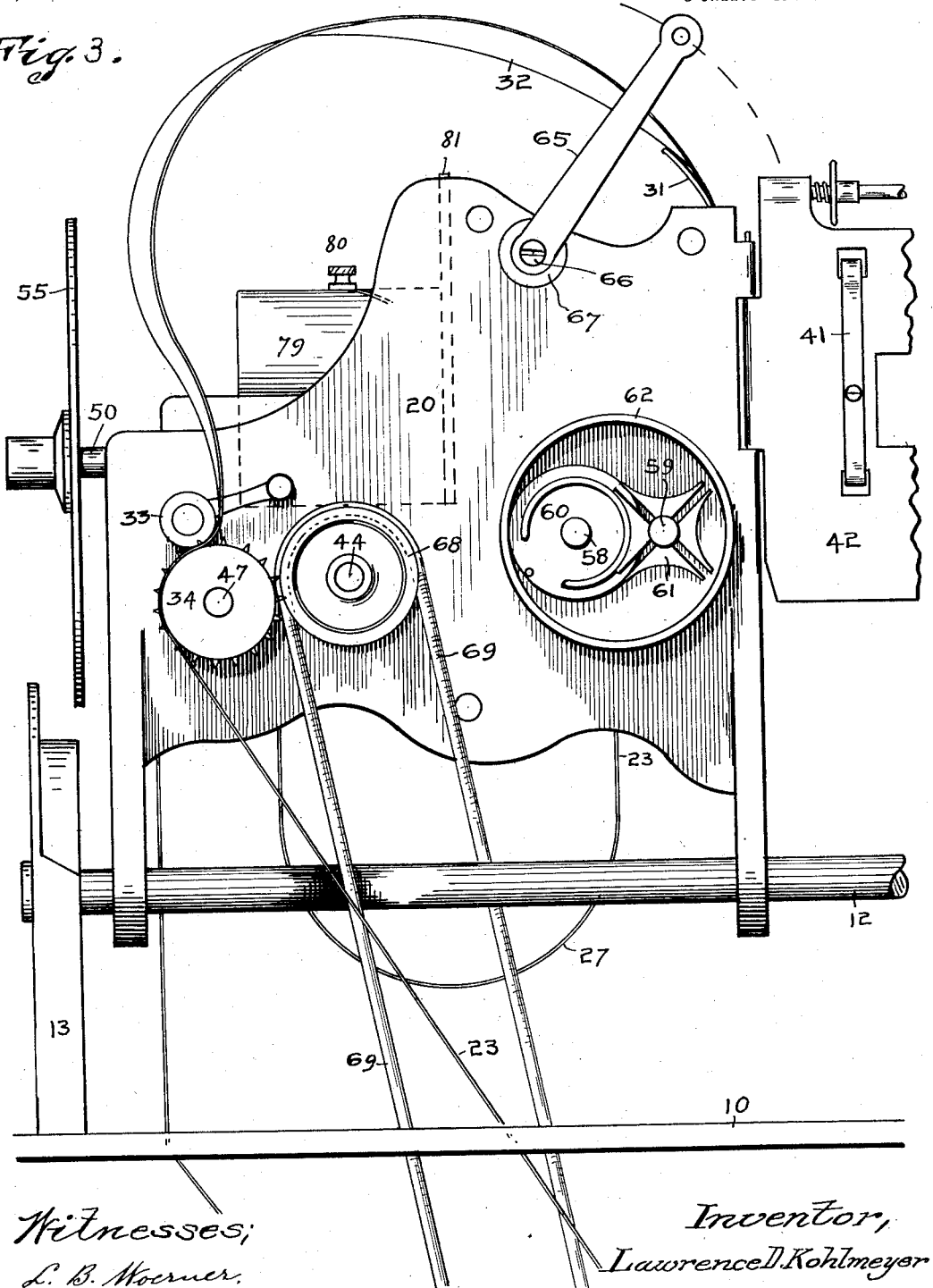

LAWRENCE D. KOHLMEYER, OF INDIANAPOLIS, INDIANA.

MOVING-PICTURE MACHINE.

1,187,153.  Specification of Letters Patent.  Patented June 13, 1916.

Application filed July 3, 1914. Serial No. 848,788.

*To all whom it may concern:*

Be it known that I, LAWRENCE D. KOHLMEYER, a citizen of the United States, residing at Indianapolis, in the county of Marion and State of Indiana, have invented certain new and useful Improvements in Moving-Picture Machines, of which the following is a specification.

This invention relates to moving picture apparatus wherein each one of an extended series of pictures in a picture film of great length is brought to rest at the moment of projection opposite a gate or window located in an optical axis of light of high intensity and the rays of light shut off by a shutter while the film is moving across the window to change the picture. The film is provided with marginal perforations to receive sprockets on feed rollers by which the progress of the film through the machine is positively controlled. It sometimes occurs, through various causes, but most frequently as a result of the tearing of the perforated portions of the film, that the film slips on the feed rollers causing the pictures to get out of register or "frame" with said window thereby rendering the projected picture correspondingly out of register and imperfect. It is also applicable to photographers' cameras.

The object of the invention particularly is to provide means for setting the film forward or back so as to bring the pictures in register with the window without changing the practical efficiency of the shutter or interfering with the operation of the machine in the performance of its usual display functions, and to provide a means for this purpose which will be simple in its nature and under the immediate control of the operator.

I accomplish the above principal objects, and other minor objects which will hereinafter appear, by the mechanism illustrated in the accompanying drawings, in which—

Figure 1 is a vertical section of my moving picture machine showing the film-reeling mechanism in operative position in full lines and swung to one side of the optical axis of light, in dotted lines. Fig. 2 is a longitudinal vertical section of the film-reeling mechanism taken on the line 3—3 of Fig. 2. In this view the tube supporting the projecting-lens is omitted. Fig. 3 is a view of the opposite side of the film-reeling mechanism from that shown in Fig. 1.

Like characters of reference indicate like parts throughout the several views of the drawings.

While my device is intended primarily for portable moving picture machines to be carried by lecturers, traveling salesmen, and others requiring a compact and simple apparatus to aid in explaining and demonstrating their discourse, it is applicable to moving picture machines for all purposes, and also to photographers' cameras, and therefore it will be understood that the particular exemplification here shown is only adopted by way of illustration.

Referring to the drawings, the case or magazine 7 is here shown as comprising a bottom, two ends and one side rigidly secured to each other, and having the remaining side 8 hinged at its lower edge to permit of its being opened outwardly and downwardly to permit ready access through the open side of the box thus formed to the interior for convenience in assembling and removing the reels. The magazine is provided with a hinged cover 9, adapted to be opened into the position shown in Fig. 2, and it is also provided with a removable false cover 10 which rests upon suitable supporting cleats and when thus positioned, as shown in Figs. 1 and 2, it forms a support for the main frame of the moving picture machine. This main frame comprises a pair of horizontal rods 11 and 12 which connect and are supported by legs 13. The rods 11 and 12 pass slidingly through tubes 14, to which tubes a pair of adjacent legs 13 are rigidly secured, and this pair of legs and the tubes also support an arc lamp 15 and a tube 16 within which is a condensing lens 17 (see Fig. 1), and in front of the lens is a slide support 18. The parts 14 to 18 inclusive are of usual and well known construction and are adjustable upon the rods 11 and 12 by sliding the tubes 14 on said rods. A given adjustment is retained by set-screws 19.

The main frame 20 of the film feeding mechanism is also mounted upon the horizontal rods 11 and 12. This main frame 20 has a pair of legs 21 with holes through which the rod 12 passes forming a hinge connection between the main frame 20 and said rod 12. The frame also has a pair of legs 22 which rest upon the rod 11 and which are notched upwardly from their lower ends to seat the rod 11 in the manner shown in Fig.

2 which permit the frame 20 to be swung to the position shown in dotted lines in Fig. 2 for greater convenience in threading the film through the machine when a new film is to be run, and which also enables the film feeding mechanism to be moved out of interference with the use of the stereopticon apparatus as such in projecting stationary pictures.

The film 23 is of usual and well known construction and is fed from a reel 24 mounted within the fire-proof magazine 7, to and over a pair of tension rollers 25 which hold it in contact with a constantly moving sprocket wheel 26. The film is then caused to form the lower loop 27 and is next passed over the film gate roller 28 and against an intermittent sprocket 29 from which it passes across a film gate 30 in a stationary partition 31 supported by the sides of the frame 20. The film passes above the main frame 20 forming the upper loop 32 and after passing under the tension roller 33 on the outside of the frame 20 contacts with the outside sprocket wheel 34 and from thence the film 23 passes down into the magazine 7 and is wound upon the spool of the reel 35 mounted within the magazine 7. The tension rollers 25 are supported by the frame 36 which swings from a horizontal shaft 37 supported by the frame 20. The outer end of frame 36 is supported by a holding lever 38 pivoted to a leg of the frame 20 and held normally in position to lock the frame 36 by spring 39. By moving the lever 38 to release the frame 36 the tension rollers can be moved away from the sprocket wheel 26 to enable the film to be threaded between the tension rollers and said sprocket wheel. The film gate roller 28 is supported by a spring-pressed frame 40 which permits the roller 28 to be moved away from the sprocket wheel 29 to enable the film to be threaded between the roller and sprocket wheel. The film is pressed against the partition 31 by a spring 41 which is secured to and is held firmly against the film by a door 42 (see Figs. 2 and 3), hinged to the frame 20. By opening the door the film is readily placed in position.

The sprocket wheel 26 is rotated continuously, and the sprocket wheel 29 intermittently by power applied through a hand crank 43 to a horizontal shaft 44 journaled in the two sides of the main frame 20. Referring to Fig. 3, it will be seen that 45 is a spur-gear wheel mounted on shaft 44, the teeth of which mesh with those of a pinion 46 mounted on the same shaft 47 on which the sprocket wheels 26 are mounted so that continuous rotary movement is transmitted by the gear mechanism above described to the sprocket wheels 26. Also mounted on the shaft 47 is a large worm wheel 48 and this wheel has driving engagement with a worm 49 mounted on a shaft 50 above the wheel 48. The shaft 50 is mounted in journals which are supported by a swingingly adjustable frame 51. The frame 51 comprises a pair of side plates each of which is in contact with the inner side wall of the main frame 20. These plates are connected by a cross wall 52. The plates of the swinging frame 51 have holes through which the shaft 47 passes and the frame 51 has swinging or oscillatory adjustment on said shaft 47, the shaft 50 oscillating with it. The frame 51 is held normally in its lowest position by a spring 53, one end of which is attached to the cross wall 52 and the other end to a cross bar 54 of the main frame 20. The shaft 50 extends at one end beyond the frame 20 and on this projecting portion a shutter 55, of usual construction and function, is mounted. Mounted near the opposite end of the shaft 50 from shutter 55 is a second worm 56 which drivingly engages a worm wheel 57 mounted on a shaft 58. The shaft 58 is journaled in the side plates of the swinging frame 51. The shaft 59 on which the intermittent sprocket wheels 29 are mounted is also journaled in the side plates of the swinging frame 51. Intermittent movement is transmitted from the continuously rotating shaft 58 to the shaft 59 by means of the gears 60 and 61, of usual construction, as shown in Fig. 4. This intermittent drive mechanism is contained within a housing 62 which oscillates with the movement of the swinging frame 51 about shaft 47.

By reason of the oscillatory adjustment of which the frame 51 is capable the film gate roller 28 and intermittent sprocket 29 are capable of adjustment in a vertical direction by a swinging movement of said frame 51. This provides a means for adjusting the pictures on the film so as to bring them in register accurately with the film gate 30 whenever they get out of register from any cause. The frame 51 is shown in the drawings at about a half-way position and it is capable of adjustment either up or down from the position shown in the drawings. This adjustment may be secured in various ways, the means here shown being by connecting the frame through a chain 63 with a windlass 64, on and off of which windlass the chain is wound by a rocking movement of the windlass thereby correspondingly raising or lowering the end of the frame to which the chain is attached. The rocking of the windlass is accomplished by means of a lever 65 fastened to a projecting end of the windlass shaft. This attachment is by means of a screw 66 (see Fig. 3), which tightens the lever to the windlass shaft, whereby the pressure of the lever against a friction pad 67 may be regulated so as to keep it great enough to hold the windlass at any given position of the lever without fastening means, as it is important to be able to hold the swinging frame 51 at any given position within its range of movement so as to retain the pictures on the film in the given register with gate 30 after each framing operation.

A belt pulley 68 is mounted on the opposite end of shaft 44 from the crank 43, and 69 is a belt connecting pulley 68 with a belt pulley 70, shown in dotted lines in Fig. 1 on the shaft 71 of the winding reel 35 so as to positively drive the winding reel. The belt pulley 70 is shown in full lines in Fig. 2.

The projecting-lens 78 (see Fig. 3), is adjustably mounted in tube 79 and is adjusted to focus by moving push-button 80. The tube is fixed to a vertical plate 81 which is removably held in vertical guides 82 in the side-walls of the frame 20.

Aside from the adjustments in focusing it the position of the lens remains unchanged, as also does the window through which the picture is to be projected. The framing of the picture is accomplished by swinging the frame 51 to bring the picture into register with the window without moving the lens, the latter being supported by the frame 20.

The film-carrying end of frame 51 is very much farther—nearly four times in the drawing—from the axis of oscillation about shaft 47, than the shutter 55, whereby a considerable adjustment of the picture for corrections in its framing is possible with comparatively little movement of the shutter. This is desirable because the position of the shutter relative to the optical axis is so little changed as to be negligible in practice. By mounting the shutter on the same shaft 50 through which power is transmitted to drive the intermittent film moving wheels 29, the required synchronized movements are positively secured with a minimum of gears, and the shutter and framing and film feeding mechanisms are all supported by the swinging frame.

The operation of the device has been so fully described in connection with the description of the parts that further specification is unnecessary.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction, and arrangement, the omission of immaterial elements, and the substitution of equivalents, as circumstances may suggest or necessity render expedient.

I claim:—

1. In a machine of the class described, the combination with a main frame of a film-feeding mechanism having an exposure window, of intermittently rotating wheels feeding a film to the window, and a framing means comprising a support for said wheels, said support having an oscillating adjustment and a shutter mounted on the support adjacent to the center of oscillation.

2. In a machine of the class described, the combination with a main frame of a film-feeding mechanism having an exposure window, of intermittently rotating wheels feeding a film to the window, a framing means comprising a support for said wheels, said support having an oscillatory adjustment, and a shutter mounted on the support adjacent to the center of oscillation, and means for oscillating said support.

3. In a machine of the class described, the combination with a main frame of a film-feeding mechanism having an exposure window, of intermittently rotating wheels feeding a film to the window, a framing means comprising a support for said wheels, said support having an oscillatory adjustment, and a shutter mounted on the support adjacent to the center of oscillation, means for oscillating said support, and means for holding a given adjustment of the support.

4. In a machine of the class described, the combination with a main frame of a film-feeding mechanism having an exposure window, of intermittently rotating wheels feeding a film toward the window, continuously rotating wheels feeding the film to form a loop between them and said intermittently rotating wheels, a shaft on which the continuously rotating wheels are mounted, and a second frame mounted to oscillate about said shaft and forming a support for said intermittently rotating wheels.

5. In a machine of the class described, the combination with a main frame of a film-feeding mechanism having an exposure window, of a second frame swingingly mounted within the main frame, a counter shaft supported by the second frame, a shutter, and intermittently rotating wheels supported from the second frame and feeding a film toward the window, said wheels and shutter being driven from the counter shaft.

6. In a machine of the class described, the combination with a main frame of a film-feeding mechanism having an exposure window, of a second frame swingingly mounted within said main frame, intermittently rotating wheels supported by the second frame and feeding a film toward the window, a shutter supported by the second frame on the opposite side of the center of oscillation of the frame from said wheels, and adjacent to said center.

7. In a machine of the class described, the combination with a main frame having an exposure window, a movable frame oscillatively supported by said main frame, of a rotating shaft supported by said movable frame, a shutter mounted on said shaft and intermittently-operative film-feeding mechanism driven from the other end of said shaft.

8. In a machine for exhibiting moving pictures, the combination with a main frame having an exposure window, of a movable frame oscillatively supported by said main frame, a rotatable shutter adapted to interrupt the passage of light through the exposure window, and intermittently-operative film-feeding mechanism, said shutter and film-feeding mechanism being supported on opposite sides of the center of oscillation of the frame by and moving with said swingingly supported frame, said shutter being closer to the center of oscillation than the film-feeding mechanism.

9. In a machine for exhibiting moving pictures, the combination with a main frame having an exposure window, of a movable frame oscillatively supported by said main frame, a rotatable shutter adapted to interrupt the passage of light through the exposure window, and intermittently-operative film-feeding mechanism, said shutter and film-feeding mechanism being supported by and moving with said swingingly supported frame, said shutter being located closer to the axis of oscillation of the movable frame than said intermittent film-feeding mechanism.

10. In a machine for exhibiting moving pictures, the combination with a main frame having an exposure window, of a movable frame oscillatively supported by said main frame, a rotatable shutter adapted to interrupt the passage of light through the exposure window, and intermittently-operative film-feeding mechanism, said shutter and film-feeding mechanism being supported by and moving with said swingingly supported frame, said shutter being located closer to the axis of oscillation of the movable frame than said intermittent film-feeding mechanism, and on the opposite side of said axis.

11. In a machine for exhibiting moving pictures, the combination with a main frame having an exposure window, a film-feeding mechanism comprising a shaft turning on a fixed axis, a movable frame oscillatable around said shaft, intermittently-operative film-feeding mechanism mounted on said movable frame, a rotatable shutter carried by the movable frame and adapted to interrupt the passage of light through said exposure window during the movement of the film across the window.

12. In a machine for exhibiting moving pictures, the combination with a main frame having an exposure window, a film-feeding mechanism comprising a driving gear and a shaft turning on a fixed axis upon which shaft said gear is mounted, a movable frame oscillatable around said shaft, intermittently-operative film-feeding mechanism mounted on said movable frame, a rotatable shutter carried by the movable frame and adapted to interrupt the passage of light through said exposure window during the movement of the film across the window, and means connected with the driving gear on said shaft for synchronously moving the intermittent film-feeding mechanism and the shutter.

13. In a machine for exhibiting moving pictures, the combination with a main frame having an exposure window, a film-feeding mechanism comprising a driving gear and a shaft turning on a fixed axis upon which shaft said gear is mounted, a movable frame oscillatable around said shaft, intermittently-operative film-feeding mechanism mounted on said movable frame, a counter-shaft carried by the movable frame, gears thereon drivingly connecting the intermittent film-feeding mechanism with said gear on said first shaft, and a shutter mounted on the counter-shaft adapted to interrupt the passage of light through said exposure window while the film is moving across the window.

14. In a machine for exhibiting moving pictures, the combination with a main frame having an exposure window, a film-feeding mechanism comprising a driving worm wheel and a shaft turning on a fixed axis upon which shaft said worm wheel is mounted, a movable frame oscillatable around said shaft, means for manually oscillating the frame, intermittently-operative film-feeding mechanism mounted on said movable frame, a counter-shaft carried by the movable frame, worm gears thereon drivingly connecting the intermittent film-feeding mechanism with said worm wheel on said first shaft, and a shutter mounted on the counter-shaft on the opposite side from the intermittent film-feeding mechanism and adapted to interrupt the passage of light through said exposure window while the film is moving across the window.

In witness whereof, I have hereunto set my hand and seal at Indianapolis, Indiana, this 27th day of June, A. D. one thousand nine hundred and fourteen.

LAWRENCE D. KOHLMEYER. [L. S.]

Witnesses:
J. A. MINTURN,
F. W. WOERNER.